United States Patent
Umeyama et al.

(10) Patent No.: US 10,147,928 B2
(45) Date of Patent: Dec. 4, 2018

(54) SECONDARY BATTERY AND BATTERY PACK

(71) Applicant: TOYOTA JIDOSHA KABUSHIKI KAISHA, Toyota-shi, Aichi-ken (JP)

(72) Inventors: Hiroya Umeyama, Okazaki (JP); Yukinobu Miyamura, Osaka (JP); Hiroaki Imanishi, Moriguchi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 164 days.

(21) Appl. No.: 15/421,682

(22) Filed: Feb. 1, 2017

(65) Prior Publication Data

US 2017/0229702 A1    Aug. 10, 2017

(30) Foreign Application Priority Data

Feb. 4, 2016   (JP) ................... 2016-019938

(51) Int. Cl.
   *H01M 2/34*   (2006.01)
   *H01M 2/02*   (2006.01)
   *H01M 10/48*  (2006.01)
   *H01M 2/10*   (2006.01)

(52) U.S. Cl.
   CPC ........... *H01M 2/345* (2013.01); *H01M 2/024* (2013.01); *H01M 2/1077* (2013.01); *H01M 10/48* (2013.01); *H01M 2200/20* (2013.01); *H01M 2220/20* (2013.01)

(58) Field of Classification Search
   CPC ............. H01M 10/48; H01M 2200/20; H01M 2220/20; H01M 2/024; H01M 2/1077; H01M 2/345; H01M 2200/10; H01M 2/34; H01M 2/348
   See application file for complete search history.

(56) References Cited

U.S. PATENT DOCUMENTS

| | | | | |
|---|---|---|---|---|
| 2011/0305928 A1* | 12/2011 | Kim | ........ | H01M 2/34 429/61 |
| 2013/0252038 A1* | 9/2013 | Kim | .......... | H01M 2/1077 429/61 |
| 2015/0140373 A1* | 5/2015 | Han | .......... | H01M 2/345 429/61 |

FOREIGN PATENT DOCUMENTS

| | | |
|---|---|---|
| EP | 2395576 A1 | 12/2011 |
| JP | 2011-258550 A | 12/2011 |

* cited by examiner

*Primary Examiner* — Barbara L Gilliam
*Assistant Examiner* — Adam A Arciero
(74) *Attorney, Agent, or Firm* — Sughrue Mion, PLLC

(57) ABSTRACT

A secondary battery includes a current cut-off device that cuts off a current flow between a battery element and an external terminal of a positive electrode, and a bypass member electrically connected to an external terminal of a negative electrode. The current cut-off device includes a current collecting member electrically connected to the battery element inside an outer casing, and an inversion plate electrically connected to the current collecting member. The inversion plate comes apart from the current collecting member when the inner pressure of the outer casing becomes increased so as to cut off conduction between the battery element and the external terminal of the positive electrode, and becomes further deformed to electrically connect the bypass member and the external terminal of the positive electrode.

7 Claims, 12 Drawing Sheets

SECONDARY BATTERY AND BATTERY PACK

INCORPORATION BY REFERENCE

The disclosure of Japanese Patent Application No. 2016-019938 filed on Feb. 4, 2016 including the specification, drawings and abstract is incorporated herein by reference in its entirety.

BACKGROUND

1. Field of the Invention

The present disclosure relates to a secondary battery and a battery pack, and particularly relates to a secondary battery including a current cut-off device, and a battery pack configured by connecting a plurality of secondary batteries of this type.

2. Description of Related Art

Japanese Patent Application Publication No. 2011-258550 discloses a secondary battery having a configuration that deforms a short-circuiting member by increase in inner pressure of a case so as to short-circuit a positive electrode terminal and a negative electrode terminal to fuse a fuse portion by an overcurrent, thereby cutting off an electric connection between the positive electrode terminal and an electrode body.

In the configuration as described in JP 2011-258550 A, the short-circuiting member is formed to be thin enough to be easily inverted by the pressure. Hence, the short-circuiting member might be fused before the fuse portion is fused due to a large current flowing in a moment at the time of the short circuit.

If the short-circuiting member is fused but the fuse portion does not work, connection between the terminal and the electrode body is maintained, so that increase in inner pressure of the case is continued. Consequently, the secondary battery might be damaged.

On the other hand, if the short-circuiting member is fused and the fuse portion works, the connection between the terminal and the electrode body is cut off, and no short circuit between the positive electrode terminal and the negative electrode terminal is formed, and thus a cut-off of conduction among batteries is caused by an abnormal secondary battery. Consequently, it becomes impossible to pick up electric power from normal batteries, which disables charging and discharging in the whole battery pack.

SUMMARY

The present disclosure provides a secondary battery capable of suppressing fusing of a portion where a short circuit between an external terminal of a first electrode and an external terminal of a second electrode is formed.

An aspect of the present disclosure is directed to a secondary battery including: a battery element; an outer casing housing the battery element thereinside; an external terminal of a first electrode and an external terminal of a second electrode that are disposed outside the outer casing; and a current cut-off device that cuts off a current flow between the battery element and the external terminal of the first electrode when an inner pressure of the outer casing becomes increased. The current cut-off device includes: a current collecting member electrically connected to the battery element inside the outer casing; and an inversion plate electrically connected to the current collecting member. The secondary battery further includes a bypass member electrically connected to the external terminal of the second electrode. The inversion plate comes apart from the current collecting member when the inner pressure of the outer casing becomes increased so as to cut off conduction between the battery element and the external terminal of the first electrode, and the inversion plate becomes further deformed to electrically connect the bypass member to the external terminal of the first electrode.

According to the above configured secondary battery, the bypass path to short-circuit the external terminals of the first and the second electrodes is formed in a state in which a path connecting the battery element and an external terminal is previously cut-off; therefore, no excessively large current is applied to the bypass path. Accordingly, it is possible to suppress fusing of a portion where a short circuit between the external terminal of the first electrode and the external terminal of the second electrode is formed.

In the aforementioned secondary battery, the bypass member may be disposed outside the outer casing. Through this configuration, it is possible to readily form the bypass path to short-circuit the external terminal of the first electrode and the external terminal of the second electrode outside the outer casing.

In the aforementioned secondary battery, the outer casing may be electrically insulated from the external terminal of the first electrode and the external terminal of the second electrode. Through this configuration, no member to electrically insulate the outer casing is required, and thus it is possible to realize the secondary battery having a simpler configuration.

In the aforementioned secondary battery, the outer casing may have an electric potential different from electric potentials of the external terminal of the first electrode and the external terminal of the second electrode. Through this configuration, it is possible to suppress occurrence of an unintended short circuit between the external terminal of the first electrode and the external terminal of the second electrode.

In the aforementioned secondary battery, the current cut-off device may include a rivet member fixed to the outer casing, the rivet member electrically connected to the external terminal of the first electrode, the rivet member supporting a periphery of the inversion plate, the rivet member formed to be hollow, and the secondary battery may further include a perforating member inserted through the rivet member so as to extend from an inside to an outside of the outer casing, the perforating member including an end coupled to the bypass member. Through this configuration, the inversion plate comes into contact with the perforating member, thereby securely forming the bypass path to short-circuit the external terminals of the positive and the negative electrodes.

In the aforementioned secondary battery, the current cut-off device may include a rivet member fixed to the outer casing, the rivet member electrically connected to the external terminal of the first electrode, the rivet member supporting a periphery of the inversion plate, the rivet member formed to be hollow, and the secondary battery may further include a perforating member inserted through the rivet member so as to extend from an inside to an outside of the outer casing, the perforating member including an end coupled to the inversion plate. Through this configuration, the perforating member comes into contact with the bypass member in accordance with the deformation of the inversion plate, thereby securely forming the bypass path to short-circuit the external terminals of the positive and the negative electrodes.

A second aspect of the present disclosure is directed to a battery pack configured by connecting a plurality of second batteries according to the aforementioned first aspect. According to the above configured battery pack, the bypass path to short-circuit the external terminals of the positive and the negative electrodes is formed if the internal pressure of the outer casing of one of the secondary batteries becomes increased; therefore, it is possible to pick up electric power from the normal secondary batteries, and charging and discharging of the entire battery pack becomes enabled.

According to the present disclosure, it is possible to suppress fusing of a portion where a short circuit between an external terminal of a first electrode and an external terminal of a second electrode is formed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
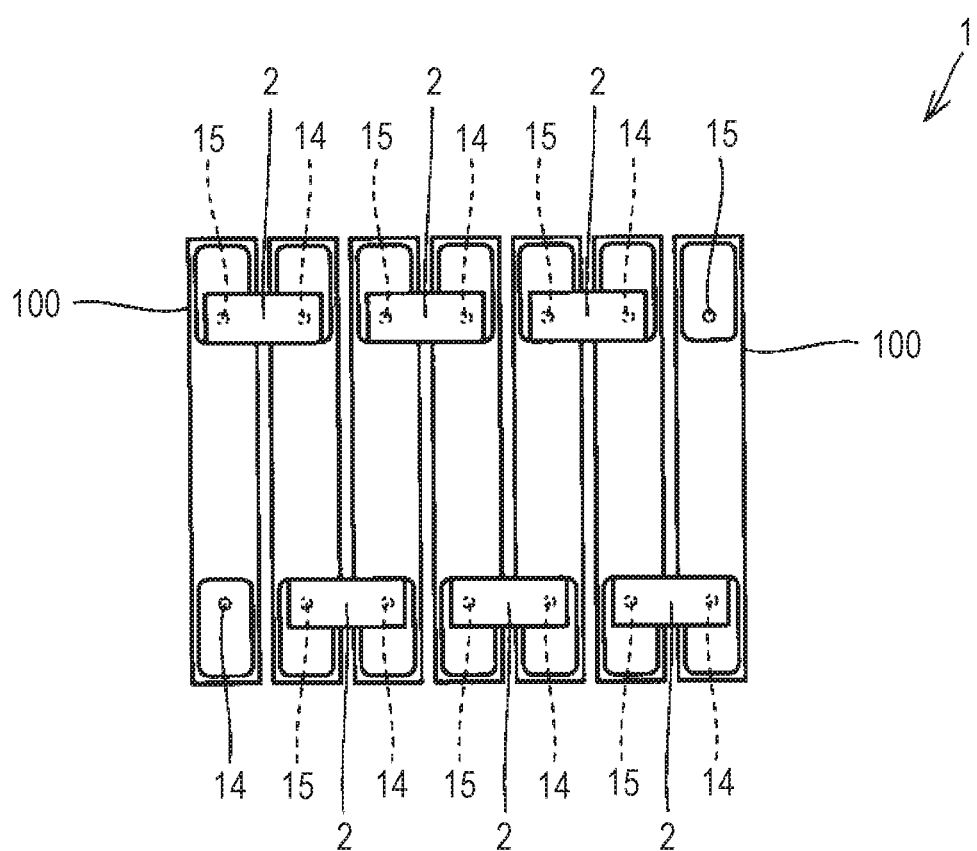
FIG. 1 is a plan view showing a battery pack in a first embodiment.

Embodiments will be described with reference to drawings, hereinafter. When the number, the quantity, and the like are mentioned, the scope of the present disclosure is not necessarily limited thereto unless otherwise specified. Identical or corresponding components are denoted with identical reference numerals, and may not be described repeatedly in some cases. In drawings, components are not illustrated using actual ratios of dimensions thereof, but are illustrated using different ratios of dimensions so as to clarify structures thereof just for easy understanding of the structures.

First Embodiment

FIG. 1 is a plan view showing a battery pack 1 in the first embodiment. The battery pack 1 according to the present embodiment is installed in a hybrid vehicle. The battery pack 1 is used along with an internal combustion engine such as a gasoline engine and a diesel engine as a power source of the hybrid vehicle.

As shown in FIG. 1, the battery pack 1 is configured by connecting a plurality of rechargeable secondary batteries 100 in series. In the battery pack 1 as shown in FIG. 1, seven secondary batteries 100, each having the same shape, are connected in series into the battery pack 1. The number of the secondary batteries 100 configuring the battery pack 1 is not limited to a particular one. A not-illustrated bundling member that integrally bundles the secondary batteries 100 is provide around the battery pack 1.

The secondary batteries 100 are arranged with a distance between each two adjacent batteries. The secondary batteries 100 are arranged such that each side surface having the greatest area of each secondary battery 100 faces each other between each two adjacent secondary batteries. A not-illustrated cooling plate, a not-illustrated buffer plate, or the like is disposed in a gap between each two adjacent secondary batteries 100.

Each secondary battery 100 includes a negative-electrode external terminal 14 and a positive-electrode external terminal 15. The secondary batteries 100 are arranged to be reversed one by one in a manner as to alternately arrange each negative-electrode external terminal 14 and each positive-electrode external terminal 15. The secondary batteries 100 are arranged such that the negative-electrode external terminal 14 of one of each two adjacent secondary batteries 100 and the positive-electrode external terminal 15 of the other secondary battery are close to each other.

The battery pack 1 includes inter-terminal connecting members 2 each of which connects each two adjacent secondary batteries 100 to each other. Each terminal connecting member 2 electrically connects the negative-electrode external terminal 14 of one of each two adjacent secondary batteries 100 to the positive-electrode external terminal 15 of the other secondary battery. Through this, the secondary batteries 100 are connected in series, thereby building the battery pack 1 having a desired voltage.

Figure 2:
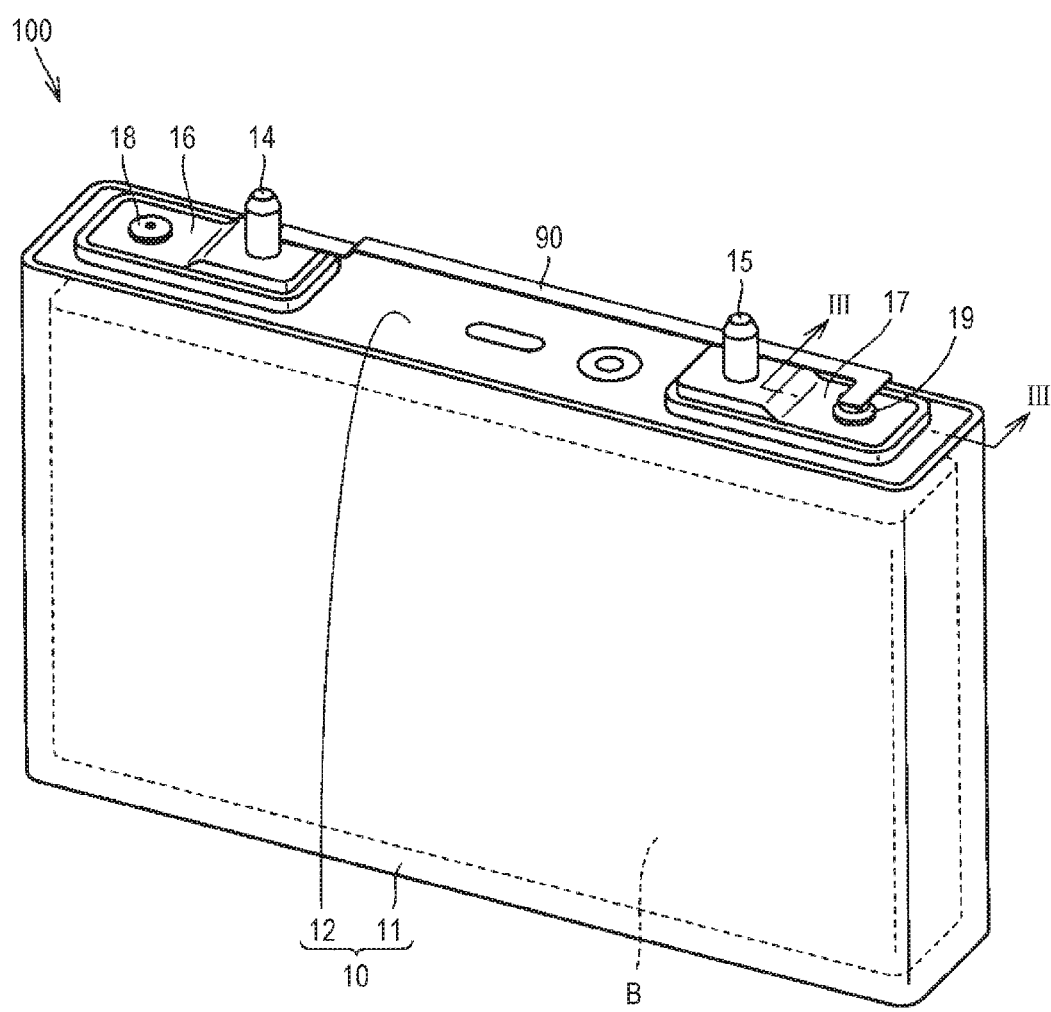
FIG. 2 is a perspective view showing a single secondary battery included in the battery pack as shown in FIG. 1.

FIG. 2 is a perspective view showing one secondary battery 100 included in the battery pack 1 as shown in FIG. 1. The secondary battery 100 includes a battery element B, an outer casing 10, the negative-electrode external terminal 14, the positive-electrode external terminal 15, and electrically-conductive plates 16, 17. The battery element B is configured by stacking positive electrode plates and negative electrode plates with separators interposed therebetween. The outer casing 10 houses the battery element (electrode body) B thereinside. The outer casing 10 includes a housing part 11 and an opening-sealing part 12. The housing part 11 has a case shape in a substantially rectangular parallelepiped opening toward one direction, and configures an outer casing of the secondary battery 100. An electrolytic solution and the battery element B are housed inside the housing part 11.

The opening-sealing part 12 has a platy shape in a substantially rectangular shape in a plan view, and is disposed to the opening of the housing part 11. The opening-sealing part 12 is so disposed as to cover the opening of the housing part 11. The housing part 11 and the opening-sealing part 12 form a sealed space in which the battery element B is housed. The housing part 11 and the opening-sealing part 12 are formed of a metallic material such as aluminum.

The negative-electrode external terminal 14 and the positive-electrode external terminal 15 are disposed outside the outer casing 10 as external terminals of the secondary battery 100. The negative-electrode external terminal 14 and the positive-electrode external terminal 15 are attached to the opening-sealing part 12.

Each secondary battery 100 includes a device of cutting off a current flow between the battery element B and the external terminal (hereinafter, referred to as a "current cut-off device") if a pressure inside the outer casing 10 becomes increased. The current cut-off device is disposed to at least one of the negative-electrode external terminal 14 and the positive-electrode external terminal 15. In the present embodiment, as a typical example, the case in which the current cut-off device is disposed to the positive-electrode external terminal 15 will be described. In the present embodiment, the positive-electrode external terminal 15 may be deemed as an external terminal of a first electrode, and the negative-electrode external terminal 14 may be deemed as an external terminal of a second electrode.

The negative-electrode external terminal 14 is inserted through the electrically-conductive plate 16. The electrically-conductive plate 16 is electrically connected to the negative-electrode external terminal 14. A rivet member 18 is provided to the electrically-conductive plate 16. The rivet member 18 is inserted through the electrically-conductive plate 16 and the opening-sealing part 12 so as to extend from the inside to the outside of the outer casing 10.

The positive-electrode external terminal 15 is inserted through the electrically-conductive plate 17. The electrically-conductive plate 17 is electrically connected to the positive-electrode external terminal 15. A rivet member 19 is provided to the electrically-conductive plate 17. The rivet member 19 is inserted through the electrically-conductive plate 17 and the opening-sealing part 12 so as to extend from the inside to the outside of the outer casing 10.

The secondary battery 100 further includes a bypass member 90. The bypass member 90 is formed of an electrically-conductive material. One end of the bypass member 90 is fixed to the electrically-conductive plate 16. The bypass member 90 is electrically connected to the electrically-conductive plate 16. The bypass member 90 is electrically connected to the negative-electrode external terminal 14 via the electrically-conductive plate 16. The other end of the bypass member 90 is disposed above the rivet member 19. The bypass member 90 is disposed apart from the rivet member 19. The bypass member 90 is disposed out of contact with the electrically-conductive plate 17.

Figure 3:
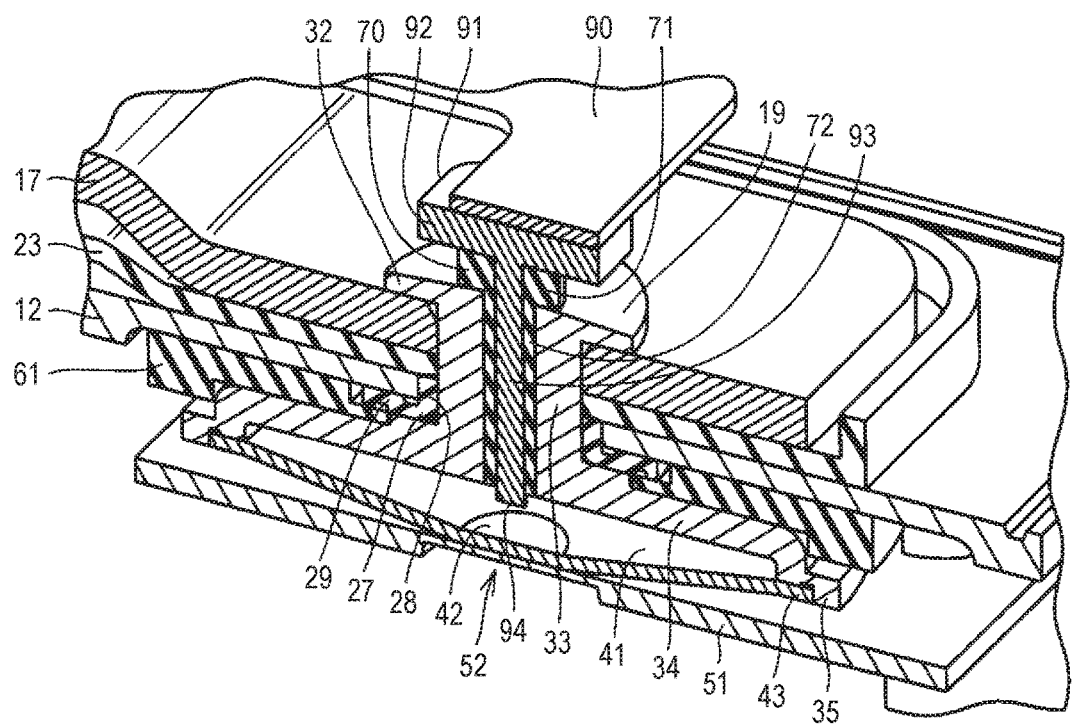
FIG. 3 is a partial sectional view of the secondary battery taken along line III-III in FIG. 2.

FIG. 3 is a cross sectional view of the secondary battery 100 taken along line III-III in FIG. 2. With reference to FIG. 3, a configuration of the current cut-off device will be described. As shown in FIG. 3, in the vicinity of the opening-sealing part 12 and the rivet member 19, there are provided an insulator 23, a gasket 27, an inversion plate 41, a current collecting member 51, and a holder member 61.

The insulator 23 is disposed outside the outer casing 10. The insulator 23 is placed on the opening-sealing part 12. The insulator 23 is interposed between the opening-sealing part 12 and the electrically-conductive plate 17. The insulator 23 is also interposed between the opening-sealing part 12 and the positive-electrode external terminal 15. The insulator 23 is formed of an electrically-insulating material, and electrically insulates the opening-sealing part 12 from the positive-electrode external terminal 15 and the electrically-conductive plate 17.

The rivet member 19 is formed of an electrically-conductive material. The rivet member 19 is formed of a metallic material such as copper and aluminum. The rivet member 19 is inserted through a through-hole formed in the opening-sealing part 12. The rivet member 19 is connected to the electrically-conductive plate 17 outside the outer casing 10, and is electrically connected to the inversion plate 41 inside the outer casing 10. The rivet member 19 electrically connects the electrically-conductive plate 17 to the inversion plate 41.

The rivet member 19 includes an outer flange portion 32, a shaft portion 33, an inner flange portion 34, and a peripheral portion 35.

The shaft portion 33 has a hollow cylindrical shape. The shaft portion 33 is inserted through the through-hole of the opening-sealing part 12 so as to extend through the opening-sealing part 12. In the outside of the outer casing 10, the shaft portion 33 is also disposed in a manner as to extend through the insulator 23 and the electrically-conductive plate 17.

The outer flange portion 32 is disposed to an end of the shaft portion 33 extending in a cylindrical shape toward the outside of the outer casing 10. In the outside of the outer casing 10, the outer flange portion 32 is connected to the end of the shaft portion 33. The outer flange portion 32 has a flange shape extending radially outward from the shaft portion 33 in a cylindrical shape. The outer flange portion 32 is in contact with the electrically-conductive plate 17. The outer flange portion 32 is electrically connected to the electrically-conductive plate 17. The insulator 23 and the electrically-conductive plate 17 are held between the outer flange portion 32 and the opening-sealing part 12.

The inner flange portion 34 is disposed to an end of the shaft portion 33 extending in a cylindrical shape toward the inside of the outer casing 10. In the inside of the outer casing 10, the inner flange portion 34 is connected to the end of the shaft portion 33. The inner flange portion 34 has a platy shape. The inner flange portion 34 has a disk shape of which center coincides with the axis of the shaft portion 33. The inner flange portion 34 on one side (in an upward direction in FIG. 3) in an extending direction of the shaft portion 33 faces the opening-sealing part 12 with a distance therebetween, and the inner flange portion 34 on the other side (in a downward direction in FIG. 3) in the extending direction of the shaft portion 33 faces the current collecting member 51 with a distance therebetween.

The peripheral portion 35 is disposed around an outer periphery of the inner flange portion 34. The peripheral portion 35 is so disposed as to be bent from the outer periphery of the inner flange portion 34 in a direction toward the current collecting member 51. A second connecting portion 43 of the inversion plate 41 described later is connected around the peripheral portion 35 through welding.

The gasket 27 is formed of an elastic resin or rubber material, such as PFA (perfluoroalkoxy alkane) and EPDM (ethylene-propylene-diene rubber). The gasket 27 is disposed in contact with the rivet member 19. The gasket 27 is interposed between the opening-sealing part 12 and the rivet member 19. The gasket 27 is disposed as a seal member between the opening-sealing part 12 and the rivet member 19 and between the opening-sealing part 12 and the holder member 61. The gasket 27 is disposed in a gap between the opening-sealing part 12 and the rivet member 19, and the gasket 27 is also disposed in a gap between the opening-sealing part 12 and the holder member 61, thereby sealing the inside of the outer casing 10 in an air-tight manner.

The gasket 27 includes a cylindrical portion 28 and a flange portion 29 as component elements thereof. The cylindrical portion 28 has a hollow cylindrical shape. The cylindrical portion 28 is inserted through the through-hole of the opening-sealing part 12. The cylindrical portion 28 is provided such that an outer circumferential surface of the cylindrical portion 28 is in contact with an inner circumferential surface of the through-hole of the opening-sealing part 12, and an inner circumferential surface thereof is in contact with an outer circumferential surface of the shaft portion 33 of the rivet member 19.

The flange portion 29 has a flange shape extending radially outward from the end of the cylindrical portion 28 in a cylindrical shape. The flange portion 29 is held between the opening-sealing part 12 and the rivet member 19, and between the opening-sealing part 12 and the holder member 61 in the extending direction of the shaft portion 33 of the rivet member 19. In the extending direction of the shaft portion 33, the flange portion 29 is fixed in a state of being compressively deformed between the opening-sealing part 12 and the rivet member 19, and also being compressively deformed between the opening-sealing part 12 and the holder member 61.

The inversion plate 41 is formed of an electrically-conductive material. The inversion plate 41 is disposed between the inner flange portion 34 of the rivet member 19 and the current collecting member 51. The inversion plate 41 is fixed to the rivet member 19 and the current collecting member 51 through welding. The inversion plate 41 electrically connects the rivet member 19 to the current collecting member 51. The inversion plate 41 has a thin platy shape having a circular plan view. The inversion plate 41 has a curved shape of which surface facing the inner flange portion 34 is concave, and of which surface facing the current collecting member 51 is convex.

The inversion plate 41 includes a first connecting portion 42 and the second connecting portion 43 as component elements thereof. The first connecting portion 42 is provided at a center of the inversion plate 41 in a circular shape in a plan view. The second connecting portion 43 is provided around the peripheral edge of the inversion plate 41 in a circular shape in a plan view. The first connecting portion 42 is provided to a front end of the inversion plate 41 that is convex on the side facing the current collecting member 51. The second connecting portion 43 extends in an annular shape along the peripheral edge of the inversion plate 41.

The first connecting portion 42 is connected to the current collecting member 51. The first connecting portion 42 is fixed to the thin-wall portion 52 of the current collecting member 51 through welding. The second connecting portion 43 is connected to the rivet member 19. The second connecting portion 43 is fixed around the peripheral portion 35 of the rivet member 19 through welding.

The holder member 61 is formed by using an electrically-insulating resin having a high rigidity, such as PPS (polyphenylene sulfide). The holder member 61 is provided inside the outer casing 10. The holder member 61 is provided as a member for holding the current collecting member 51 inside the outer casing 10. The holder member 61 has a shape surrounding the rivet member 19 and the inversion plate 41. The holder member 61 is fixed in a manner as to be held between the opening-sealing part 12 and the inner flange portion 34 of the rivet member 19.

The current collecting member 51 functions as a contact point between the battery element B and the current cut-off device inside the outer casing 10. The current collecting member 51 is held by the holder member 61 inside the outer casing 10. The current collecting member 51 faces the inner flange portion 34 of the rivet member 19 with a distance therebetween.

The current collecting member 51 includes the thin-wall portion 52. The thin-wall portion 52 has a thin-wall shape that is defined to be thinner than the other portion by a groove formed in the current collecting member 51. The current collecting member 51 is connected to the inversion plate 41 in the thin-wall portion 52. A current collecting terminal 53 described later is disposed to the current collecting member 51 in a manner as to extend in a direction apart from the opening-sealing part 12. The current collecting terminal 53 extends from the current collecting member 51, and is connected to the electrode plate of the battery element B as shown in FIG. 1. The current collecting member 51 is electrically connected to the battery element B via the current collecting terminal 53.

An assembling (a caulking) process of the current cut-off device will be described. The holder member 61, the gasket 27, the opening-sealing part 12, the insulator 23, and the electrically-conductive plate 17 are stacked in this order on the inner flange portion 34 of the rivet member 19 as shown in FIG. 3. In this state, the shaft portion 33 extends through a stacked body of the holder member 61, the gasket 27, the opening-sealing part 12, the insulator 23, and the electrically-conductive plate 17 stacked on the inner flange portion 34.

The outer flange portion 32 of the rivet member 19 is arranged as shown in FIG. 3 through the caulking, but before the caulking, a member corresponding to the outer flange portion 32 has a cylindrical shape having the same diameter as a diameter of the shaft portion 33, and is arranged to be concentric to the shaft portion 33. Hence, before the assembly of the current cut-off device, the outer flange portion 32 and the shaft portion 33 are provided as an integral cylindrical member.

A load in a stacking direction of the stacked body is applied to the stacked body of the holder member 61, the gasket 27, the opening-sealing part 12, the insulator 23, and the electrically-conductive plate 17 from the electrically-conductive plate 17 side. A compression force in an extending direction of the shaft portion 33 of the rivet member 19 is applied to the gasket 27, thereby obtaining a state in which the upper surface of the flange portion 29 comes into contact with the opening-sealing part 12, and the lower surface of the flange portion 29 comes into contact with the rivet member 19 and the holder member 61. In this state, the end of the above cylindrical member is enlarged in a radially outward direction by using a dedicated punching tool so as to form the outer flange portion 32, thereby holding the aforementioned stacked body between the inner flange portion 34 and the outer flange portion 32 of the rivet member 19 to be integrally caulked. In this manner, all the components are fixed, and thus the assembly of the current cut-off device is completed.

An electrically-conductive member 91 and an electrically-insulating member 70 are so arranged as to extend through the shaft portion 33 of the rivet member 19 formed to be hollow. The electrically-conductive member 91 is formed of an electrically-conductive material. The electrically-insulating member 70 is formed of an electrically-insulating material.

The electrically-conductive member 91 includes a head portion 92 and a body portion 93 as component elements thereof. The body portion 93 is inserted through the through-hole formed in the shaft portion 33 of the rivet member 19. The body portion 93 extends through the shaft portion 33 of the rivet member 19 so as to extend from the inside to the outside of the outer casing 10. The head portion 92 is provided to one end of the body portion 93. A front end 94 is provided to the other end of the body portion 93.

The head portion 92 is fixed to the end of the body portion 93 located outside the outer casing 10 in FIG. 3. In FIG. 3, the end of the body portion 93 located inside the outer casing 10 configures the front end 94. The front end 94 projects from the through-hole formed in the shaft portion 33 of the rivet member 19. The front end 94 faces the first connecting portion 42 of the inversion plate 41. The front end 94 as shown in FIG. 3 is disposed apart from the first connecting portion 42 of the inversion plate 41.

The electrically-insulating member 70 includes a head portion 71 and a body portion 72 as component elements thereof. The body portion 72 has a hollow cylindrical shape. The body portion 72 is inserted through the through-hole formed in the shaft portion 33 of the rivet member 19. The body portion 72 extends from the inside to the outside of the outer casing 10. The head portion 71 is attached to one end of the body portion 72. The head portion 71 is fixed to the end of the body portion 72 located outside the outer casing 10 in FIG. 3.

The head portion 71 of the electrically-insulating member 70 is interposed between the head portion 92 of the electrically-conductive member 91 and the outer flange portion 32 of the rivet member 19. The head portion 92 of the electrically-conductive member 91 is disposed with a distance from the outer flange portion 32 of the rivet member 19. The body portion 72 of the electrically-insulating member 70 is interposed between the body portion 93 of the electrically-conductive member 91 and the shaft portion 33 of the rivet member 19. An inner circumferential surface of the body portion 72 is in contact with an outer circumferential surface of the body portion 93, and an outer circumferential surface of the body portion 72 is in contact with the inner circumferential surface of the through-hole of the shaft portion 33. The body portion 93 of the electrically-conductive member 91 is disposed with a distance from the shaft portion 33 of the rivet member 19.

The electrically-insulating member 70 is disposed between the electrically-conductive member 91 and the rivet member 19, so that the electrically-conductive member 91 is out of contact with the rivet member 19. The electrically-conductive member 91 is not electrically connected to the rivet member 19. The electrically-conductive member 91 is electrically insulated from the rivet member 19. The bypass member 90 as shown in FIG. 3 is not electrically connected to the electrically-conductive plate 17 and the positive-electrode external terminal 15.

The head portion 92 of the electrically-conductive member 91 is in contact with the bypass member 90. The electrically-conductive member 91 is electrically connected to the bypass member 90. The electrically-conductive member 91 is electrically connected to the negative-electrode external terminal 14 via the bypass member 90.

Figure 4:
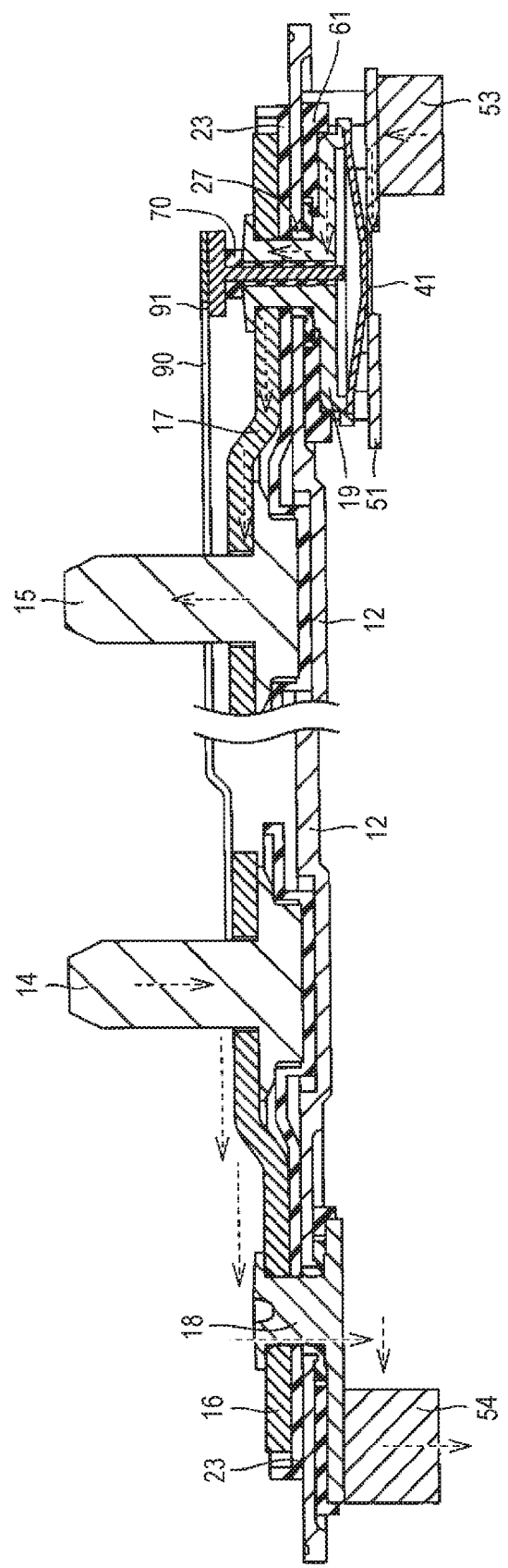
FIG. 4 is a schematic sectional view showing a current flow in the secondary battery in a normal state.

FIG. 4 is a schematic cross sectional view showing a current flow in the secondary battery 100 in a normal state. FIG. 4 enlargingly shows respective cross sectional views of the secondary battery 100 including the negative-electrode external terminal 14 and the rivet member 18, and the secondary battery 100 including the positive-electrode external terminal 15 and the aforementioned current cut-off device, as shown in FIG. 2.

As shown in FIG. 4, the negative-electrode external terminal 14 and the electrically-conductive plate 16 are disposed outside the outer casing 10. The insulator 23 is interposed between the opening-sealing part 12, and the negative-electrode external terminal 14 and the electrically-conductive plate 16. Through this, the outer casing 10 is electrically insulated from the negative-electrode external terminal 14 and the electrically-conductive plate 16.

The positive-electrode external terminal 15 and the electrically-conductive plate 17 are disposed outside the outer casing 10. The insulator 23 is interposed between the opening-sealing part 12, and the positive-electrode external terminal 15 and the electrically-conductive plate 17. Through this, the outer casing 10 is electrically insulated from the positive-electrode external terminal 15 and the electrically-conductive plate 17.

The rivet member 18 is formed of an electrically-conductive material. The rivet member 18 is formed of a metallic material, such as copper and aluminum. The rivet member 18 is inserted through the through-hole formed in the opening-sealing part 12. The rivet member 18 is connected to the electrically-conductive plate 16 outside the outer casing 10, and is connected to a current collecting terminal 54 inside the outer casing 10. The rivet member 18 is electrically connected to the electrically-conductive plate 16 and the current collecting terminal 54.

Broken line arrows as shown in FIG. 4 indicate current flows. In the normal state before the current cut-off device works, the current flows from the negative-electrode external terminal 14 through the electrically-conductive plate 16, the rivet member 18, and the current collecting terminal 54 to the battery element B in this order. The current flows from the battery element B through the current collecting terminal 53, the current collecting member 51, the inversion plate 41, the rivet member 19, the electrically-conductive plate 17 to the positive-electrode external terminal 15 in this order. Through this, electric power is supplied from each secondary battery 100 to the outside. At the charging time of the secondary batteries 100, the current flows in a reverse direction to this direction.

Figure 5:
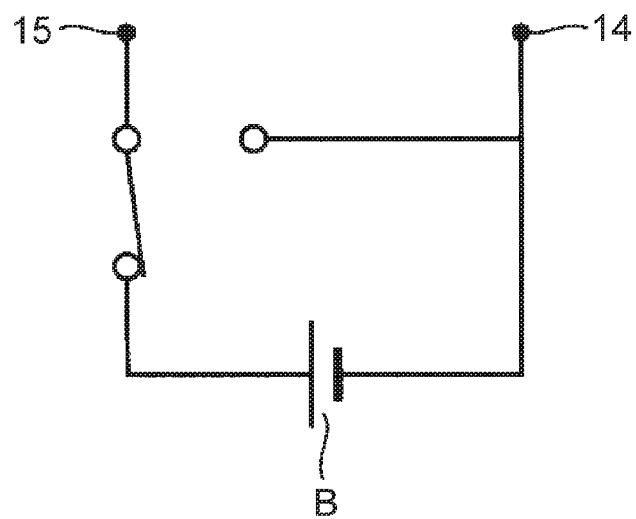
FIG. 5 is a drawing showing an electric circuit formed in the secondary battery in the normal state.

FIG. 5 is a drawing showing an electric circuit formed by the secondary battery 100 in the normal state. As shown in FIG. 5, in the normal state, there is formed an electric circuit in which the negative-electrode external terminal 14, the battery element B, and the positive-electrode external terminal 15 are connected.

Figure 6:
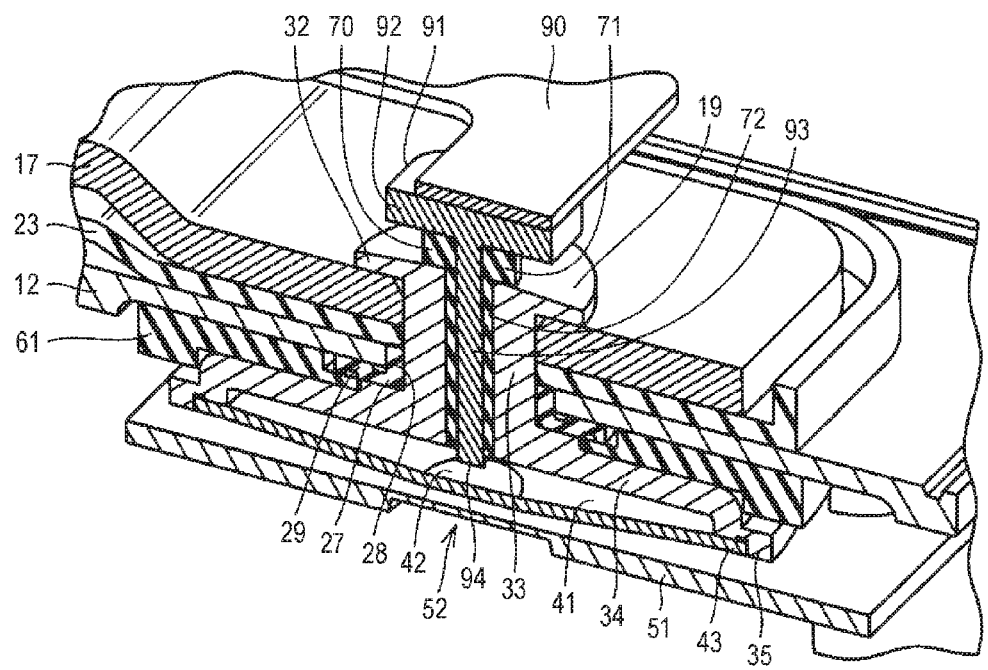
FIG. 6 is a partial sectional view of the secondary battery in a state immediately after an inversion plate is broken.

FIG. 6 is a partial cross sectional view of the secondary battery 100 in a state immediately after the inversion plate 41 is broken. If the pressure inside the outer casing 10 becomes abruptly increased, the thin-wall portion 52 of the current collecting member 51 is pushed by gas inside the outer casing 10. As shown in FIG. 6, the welded portion between the current collecting member 51 and the inversion plate 41, or the thin-wall portion 52 of the current collecting member 51 is broken so that the inversion plate 41 and the current collecting member 51 are disconnected each other. Through this operation of the current cut-off device, the current flow between the battery element B and the positive-electrode external terminal 15 is cut off.

After the breakage, the inversion plate 41 comes apart from the current collecting member 51, and also comes out of contact with the electrically-conductive member 91. The inversion plate 41 comes into a state of being out of electric contact with both the current collecting member 51 and the electrically-conductive member 91.

Figure 7:
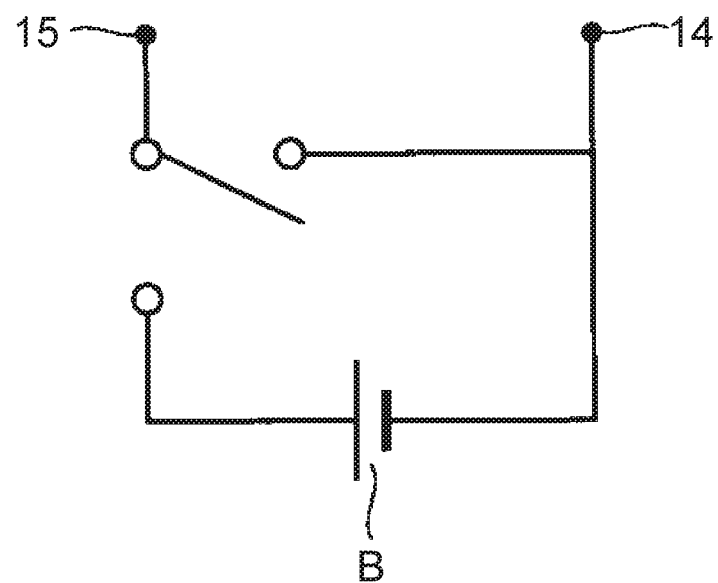
FIG. 7 is a drawing showing the electric circuit formed by the secondary battery immediately after the inversion plate is broken.

FIG. 7 is a drawing showing an electric circuit formed by the secondary battery 100 in the state immediately after the inversion plate 41 becomes broken. In comparison between FIG. 5 and FIG. 7, in the state immediately after the breakage, an electric conduction between the battery element B and the positive-electrode external terminal 15 is cut off. Through this, the circuit to the battery element B is cut off. On the other hand, as shown in FIG. 7, in the state immediately after the breakage, the bypass path to short-circuit the negative-electrode external terminal 14 and the positive-electrode external terminal 15 is also cut off.

Figure 8:
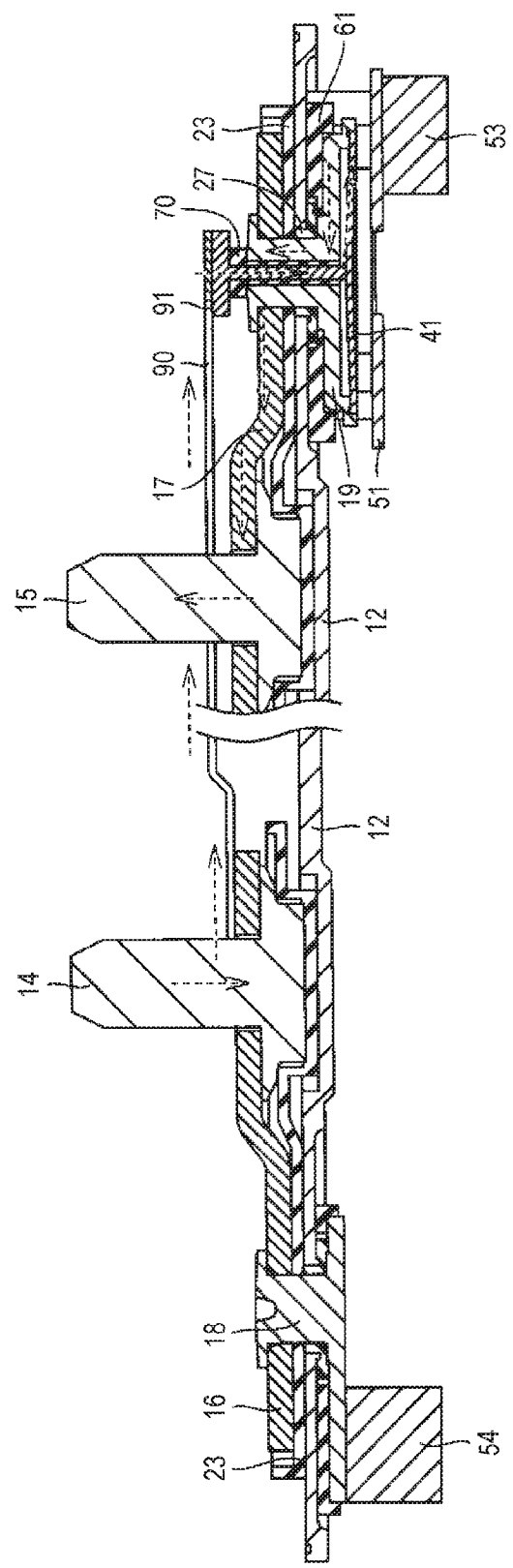
FIG. 8 is a schematic sectional view showing a current flow in the secondary battery in a state after the inversion plate is inverted.

FIG. 8 is a schematic sectional view showing a current flow inside the secondary battery 100 after the inversion plate 41 is inverted. The inversion plate 41 separated from the current collecting member 51 becomes deformed in a direction apart from the current collecting member 51. More specifically, the inversion plate 41 becomes inverted such that the inversion plate 41 becomes convex on a side thereof that faces the inner flange portion 34, and becomes concave on a side thereof that faces the current collecting member 51.

When the inversion plate 41 becomes inverted, the first connecting portion 42 of the inversion plate 41 comes into contact with the front end 94 of the electrically-conductive member 91. The inversion plate 41 is electrically connected to the electrically-conductive member 91. Through this, the negative-electrode external terminal 14 is electrically connected to the positive-electrode external terminal 15 via the electrically-conductive plate 16, the bypass member 90, the electrically-conductive member 91, the inversion plate 41, the rivet member 19, and the electrically-conductive plate 17.

Broken line arrows as shown in FIG. 8 indicate current flows. In the state after the inversion plate 41 is inverted, the current flows from the negative-electrode external terminal 14 through the electrically-conductive plate 16, the bypass member 90, the electrically-conductive member 91, the inversion plate 41, the rivet member 19, and the electrically-conductive plate 17 to the positive-electrode external terminal 15.

Figure 9:
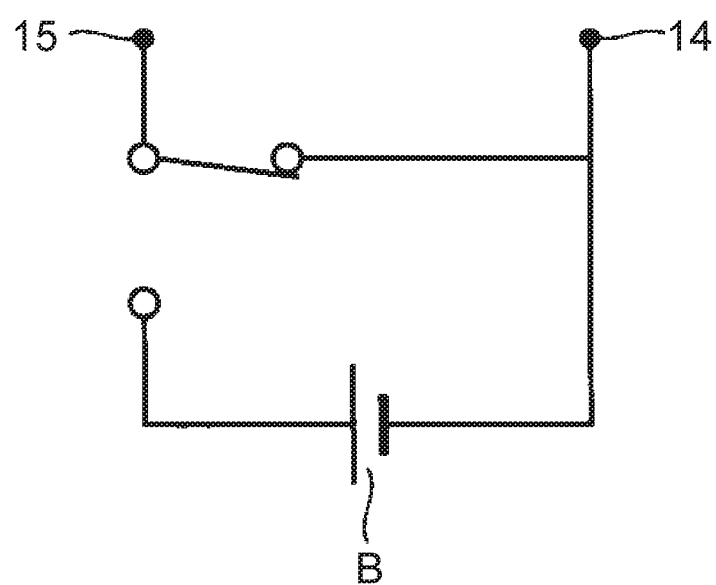
FIG. 9 is a drawing showing an electric circuit formed by the secondary battery in the state after the inversion plate is inverted.

FIG. 9 is a drawing showing an electric circuit formed by the secondary battery 100 in the state after the inversion plate 41 is inverted. As shown in FIG. 9, the negative-electrode external terminal 14 is electrically connected to the positive-electrode external terminal 15 through a path to bypass the battery element B. While the current flow to the battery element B is cut-off, the bypass path that electrically connects the pair of external terminals to each other is formed.

Second Embodiment

Figure 10:
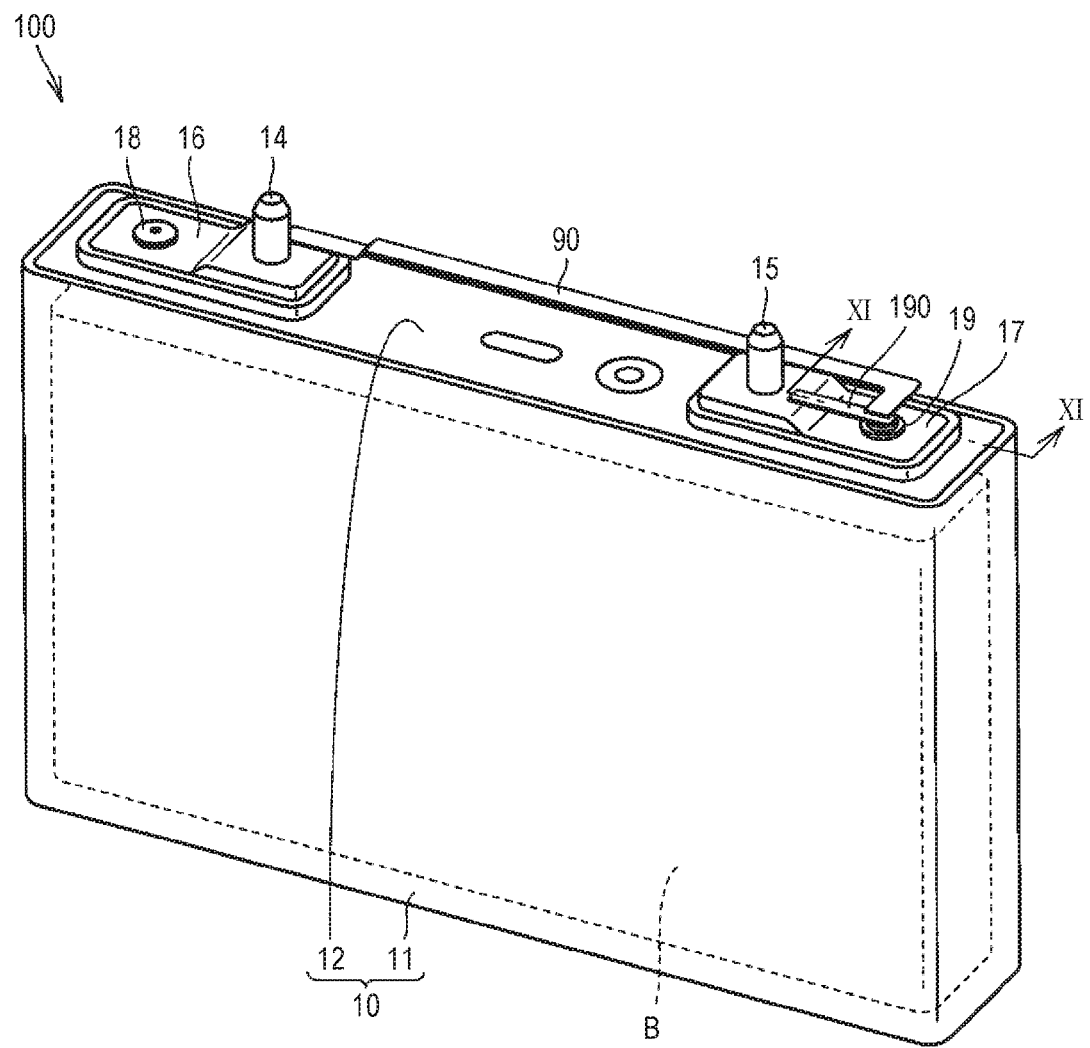
FIG. 10 is a perspective view showing a secondary battery in a second embodiment.
Figure 11:
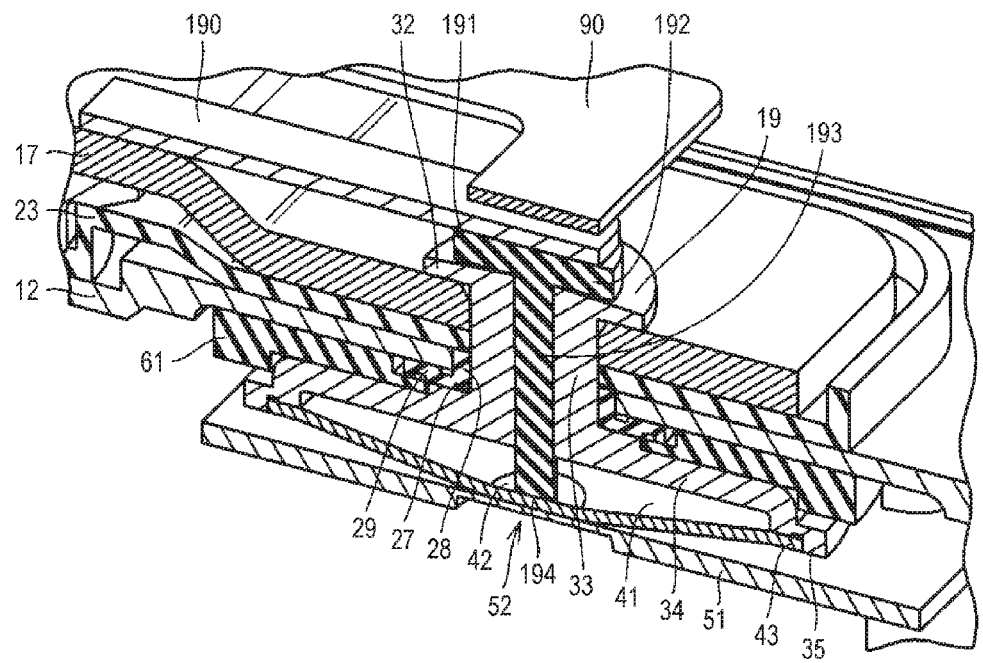
FIG. 11 is a partial sectional view of the secondary battery taken along line XI-XI in FIG. 10.

FIG. 10 is a perspective view showing the secondary battery 100 in the second embodiment. FIG. 11 is a partial sectional view of the secondary battery 100 taken along line XI-XI in FIG. 10. In the secondary battery 100 of the second embodiment, an electrically-insulating member 191 is inserted through the shaft portion 33 of the rivet member 19 that is formed to be hollow. The electrically-insulating member 191 is formed of an electrically-insulating material.

The electrically-insulating member 191 includes a head portion 192 and a body portion 193 as component elements thereof. The body portion 193 is inserted through the through-hole formed in the shaft portion 33 of the rivet member 19. The body portion 193 is inserted through the shaft portion 33 of the rivet member 19 so as to extend from the inside to the outside of the outer casing 10. The head portion 192 is fixed to one end of the body portion 193. A front end 194 is provided to the other end of the body portion 193.

The head portion 192 is fixed to the end of the body portion 193 located outside the outer casing 10. The end of the body portion 193 located inside the outer casing 10 configures the front end 194. The front end 194 projects from the through-hole formed in the shaft portion 33 of the rivet member 19. The front end 194 is in contact with the first connecting portion 42 of the inversion plate 41. The front end 194 may be fixed to the inversion plate 41.

The electrically-insulating member 191 is so provided as to be reciprocatively movable in an extending direction of the through-hole formed in the shaft portion 33. The electrically-insulating member 191 is so provided as to be slidable along an extending direction of the body portion 193 in both directions relative to the rivet member 19.

The secondary battery 100 of the second embodiment further includes a bypass member 190. The bypass member 190 is formed of an electrically-conductive material. One end of the bypass member 190 is fixed to the electrically-conductive plate 17. The bypass member 190 is electrically connected to the electrically-conductive plate 17. The bypass member 190 is electrically connected to the positive-electrode external terminal 15 via the electrically-conductive plate 17. The other end of the bypass member 190 is fixed to the head portion 192 of the electrically-insulating member 191.

The head portion 192 of the electrically-insulating member 191 is in contact with the outer flange portion 32 of the rivet member 19. The head portion 192 is interposed between the bypass member 190 and the outer flange portion 32 of the rivet member 19. The bypass member 190 is so provided as to be out of contact with the rivet member 19. The bypass member 190 is not electrically connected to the rivet member 19.

The bypass member 90 is disposed above the end of the bypass member 190 fixed to the head portion 192 of the electrically-insulating member 191. The bypass member 90 is disposed apart from the rivet member 19, the electrically-insulating member 191, and the bypass member 190. The bypass member 90 is so disposed as to be out of contact with the rivet member 19, the electrically-insulating member 191, and the bypass member 190. The bypass member 90 as shown in FIG. 10 and FIG. 11 is not electrically connected to the electrically-conductive plate 17 and the positive-electrode external terminal 15.

Figure 12:
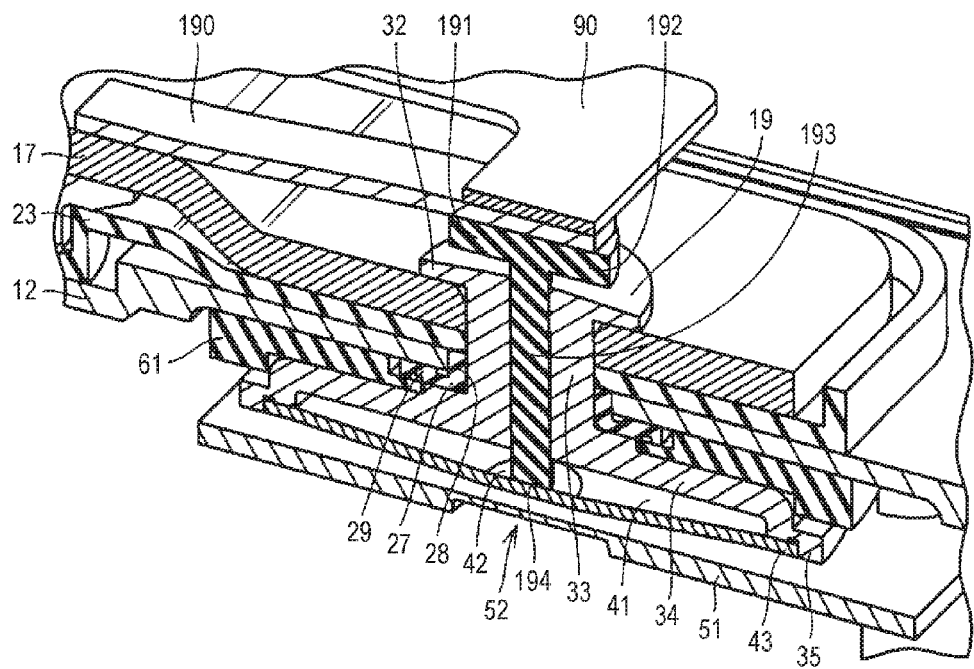
FIG. 12 is a partial sectional view showing the secondary battery of the second embodiment in the state after the inversion plate is inverted.

FIG. 12 is a partial sectional view showing a state after the inversion plate 41 of the secondary battery 100 of the second embodiment is inverted. As similar to the first embodiment, if the pressure inside the outer casing 10 becomes abruptly increased, the inversion plate 41 comes apart from the current collecting member 51 to be inverted. Through this operation of the inversion plate 41, the current flow between the battery element B and the positive-electrode external terminal 15 is cut-off.

The front end 194 of the body portion 193 of the electrically-insulating member 191 abuts against a surface of the inversion plate 41 facing the inner flange portion 34 of the rivet member 19. The electrically-insulating member 191 moves in a direction apart from the current collecting member 51 in accordance with the inversion of the inversion plate 41. The head portion 192 of the electrically-insulating member 191 moves in a direction apart from the outer flange portion 32 of the rivet member 19. The bypass member 190 fixed to the electrically-insulating member 191 moves in a direction apart from the outer flange portion 32 of the rivet member 19 toward the bypass member 90 in accordance with the movement of the electrically-insulating member 191.

As shown in FIG. 12, the bypass member 90 and the bypass member 190 come into contact with each other. In this state, the bypass member 90 is electrically connected to the bypass member 190. The bypass member 90 is electrically connected to the negative-electrode external terminal 14. The bypass member 190 is electrically connected to the positive-electrode external terminal 15. The negative-electrode external terminal 14 is connected to the positive-electrode external terminal 15 via the electrically-conductive plate 16, the bypass member 90, the bypass member 190, and the electrically-conductive plate 17.

In this manner, the bypass path as described with reference to FIG. 9 is formed. In the state after the inversion plate 41 is inverted, the current flows from the negative-electrode external terminal 14 through the electrically-conductive plate 16, the bypass member 90, the bypass member 190, and the electrically-conductive plate 17 to the positive-electrode external terminal 15.

Third Embodiment

Figure 13:
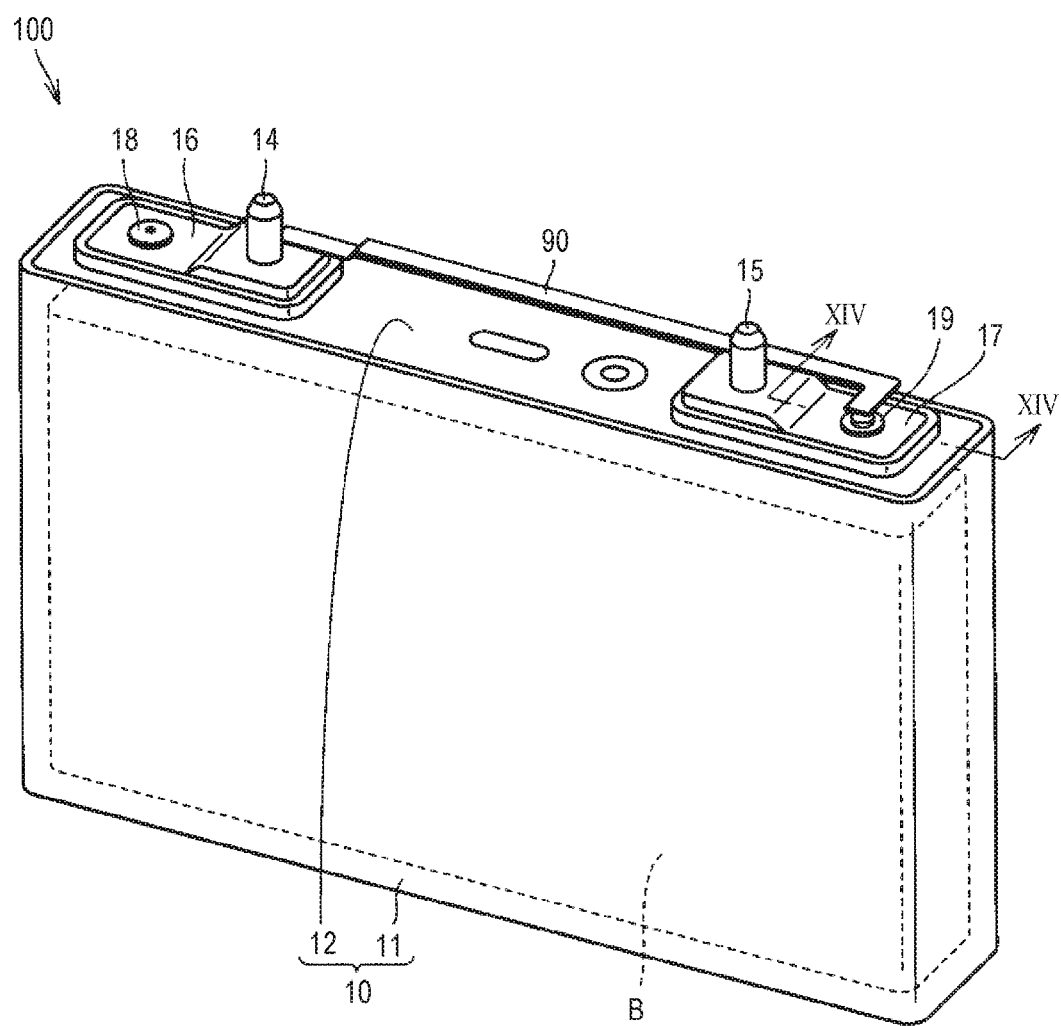
FIG. 13 is a perspective view showing a secondary battery of a third embodiment.
Figure 14:
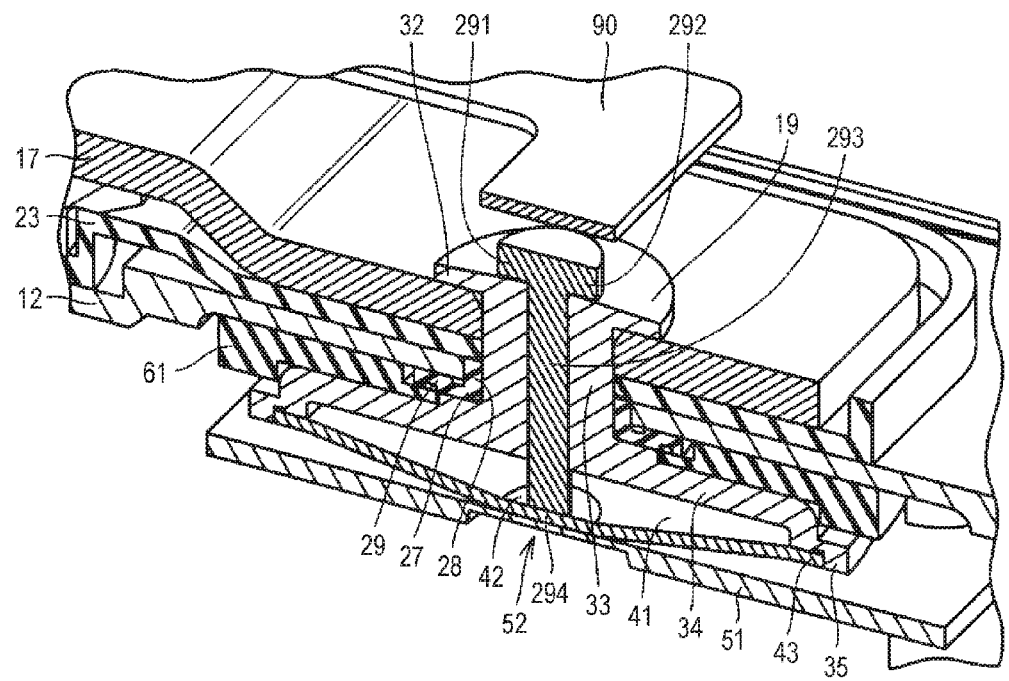
FIG. 14 is a partial sectional view of the secondary battery taken along line XIV-XIV in FIG. 13.

FIG. 13 is a perspective view showing the secondary battery 100 in the third embodiment. FIG. 14 is a partial sectional view of the secondary battery 100 taken along line XIV-XIV in FIG. 13. In the secondary battery 100 of the third embodiment, an electrically-conductive member 291 is inserted through the shaft portion 33 of the rivet member 19 that is formed to be hollow. The electrically-conductive member 291 is formed of an electrically-conductive material.

The electrically-conductive member 291 includes a head portion 292, and a body portion 293 as component elements thereof. The body portion 293 is inserted through the through-hole formed in the shaft portion 33 of the rivet member 19. The body portion 293 extends through the shaft portion 33 of the rivet member 19 so as to extend from the inside to the outside of the outer casing 10. The head portion 292 is fixed to one end of the body portion 293. A front end 294 is provided to the other end of the body portion 293.

The head portion 292 is fixed to the end of the body portion 293 located outside the outer casing 10. The front end 294 is configured by the end of the body portion 293 located inside the outer casing 10. The front end 294 projects from the through-hole formed in the shaft portion 33 of the rivet member 19. The front end 294 is in contact with the first connecting portion 42 of the inversion plate 41. The front end 294 may be fixed to the inversion plate 41.

The electrically-conductive member 291 is so provided as to be reciprocatively movable in the extending direction of the through hole formed in the shaft portion 33. The electrically-conductive member 291 is so provided as to be slidable along an extending direction of the body portion 293 in both directions relative to the rivet member 19.

The head portion 292 of the electrically-conductive member 291 is in contact with the outer flange portion 32 of the rivet member 19. An outer circumferential surface of the body portion 293 of the electrically-conductive member 291 is in contact with the inner circumferential surface of the through-hole formed in the shaft portion 33. The electrically-conductive member 291 is in contact with the rivet member 19. The electrically-conductive member 291 is electrically connected to the rivet member 19.

The bypass member 90 is disposed above the head portion 292 of the electrically-conductive member 291. The bypass member 90 is disposed apart from the rivet member 19 and the electrically-conductive member 291. The bypass member 90 is disposed out of contact with the rivet member 19 and the electrically-conductive member 291. The bypass member 90 as shown in FIG. 13 and FIG. 14 is not electrically connected to the electrically-conductive plate 17 and the positive-electrode external terminal 15.

Figure 15:
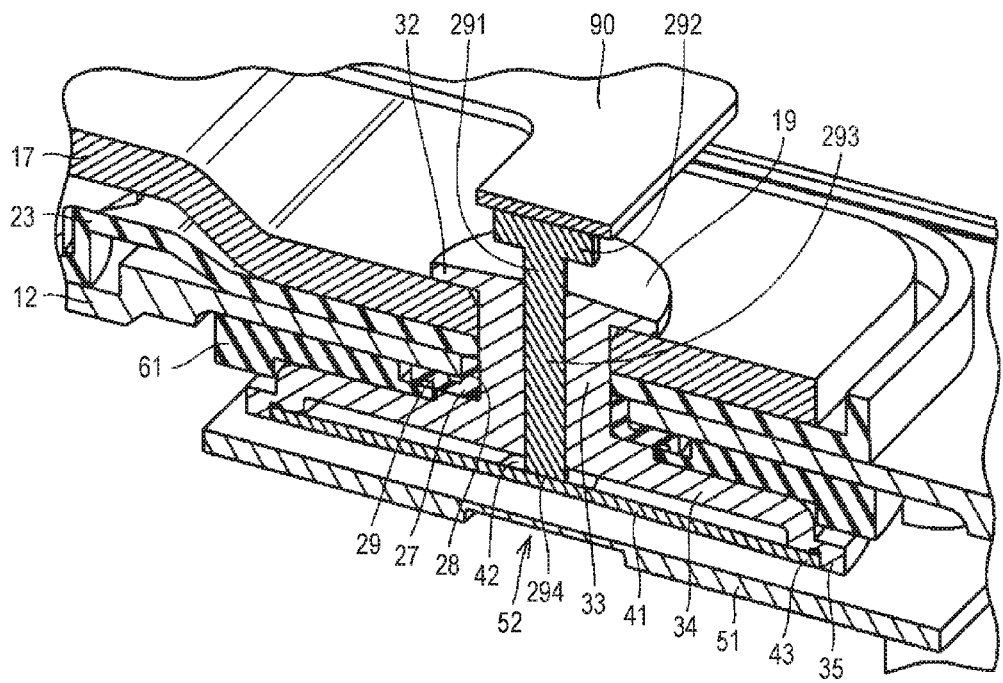
FIG. 15 is a partial sectional view showing the secondary battery of the third embodiment in the state after the inversion plate is inverted.

FIG. 15 is a partial sectional view showing a state after the inversion plate 41 of the secondary battery 100 of the third embodiment is inverted. As similar to the first embodiment, if the pressure inside the outer casing 10 becomes abruptly increased, the inversion plate 41 comes apart from the current collecting member 51 to be inverted. Through the operation of the inversion plate 41, the current flow between the battery element B and the positive-electrode external terminal 15 is cut off.

The front end 294 of the body portion 293 of the electrically-conductive member 291 abuts against the surface of the inversion plate 41 facing the inner flange portion 34 of the rivet member 19. The electrically-conductive member 291 moves in the direction apart from the current collecting member 51 in accordance with the inversion of the inversion plate 41. The head portion 292 of the electrically-conductive member 291 moves in the direction apart from the outer flange portion 32 of the rivet member 19 toward the bypass member 90.

As shown in FIG. 15, the bypass member 90 and the electrically-conductive member 291 come into contact with each other. In this state, the bypass member 90 is electrically connected to the electrically-conductive member 291. The bypass member 90 is electrically connected to the negative-electrode external terminal 14. The electrically-conductive member 291 is electrically connected to the positive-electrode external terminal 15. The negative-electrode external terminal 14 and the positive-electrode external terminal 15 are electrically connected to each other via the electrically-conductive plate 16, the bypass member 90, the electrically-conductive member 291, and the electrically-conductive plate 17.

In this manner, the bypass path as described with reference to FIG. 9 is formed. In the state after the inversion plate 41 is inverted, the currents flows from the negative-electrode external terminal 14 through the electrically-conductive plate 16, the bypass member 90, the electrically-conductive member 291, the rivet member 19, and the electrically-conductive plate 17 to the positive-electrode external terminal 15.

The configurations, and operation and effects of each secondary battery 100 and the battery pack 1 of the embodiments will be summarized as follows. Components of the embodiments are denoted with reference numerals, but this is only an example.

As shown in FIG. 2, the secondary battery 100 in each embodiment includes the battery element B, the outer casing 10 housing the battery element B thereinside, and the positive-electrode external terminal 15 and the negative-electrode external terminal 14 that are disposed outside the outer casing 10. As shown in FIG. 3, the secondary battery 100 further includes the current cut-off device. The current cut-off device is a device for cutting off the current flow between the battery element B and the positive-electrode external terminal 15 if the inner pressure of the outer casing 10 becomes increased. As shown in FIG. 3, inside the outer casing 10, the current cut-off device includes the current collecting member 51 electrically connected to the battery element B and the inversion plate 41 electrically connected to the current collecting member 51. As shown in FIG. 2, the secondary battery 100 further includes the bypass member 90 electrically connected to the negative-electrode external terminal 14. When the inner pressure of the outer casing 10 becomes increased, the inversion plate 41 comes apart from the current collecting member 51 so as to cut off the conduction between the battery element B and the positive-electrode external terminal 15, and further becomes deformed to electrically connect the bypass member 90 to the positive-electrode external terminal 15.

When the inner pressure of the outer casing 10 becomes increased, the electric connection between the battery element B and the external terminal is first cut off inside the outer casing 10, and thus the current flow between the battery element B and the external terminal is securely cut off. Through this, increase in inner pressure of the outer casing 10 can securely be stopped, and thus it is possible to enhance reliability of each secondary battery 100. The bypass path to short-circuit the external terminals of the positive and the negative electrodes is formed while the path connecting the battery element B and the external terminal is previously cut off; therefore, no excessively large current is applied to the bypass path. Accordingly, fusing of the portion where a short circuit between the positive-electrode external terminal 15 and the negative-electrode external terminal 14 is formed can be suppressed, thereby securely forming the bypass path.

As shown in FIG. 2 and FIG. 3, the bypass member 90 is disposed outside the outer casing 10. The positive-electrode external terminal 15 and the negative-electrode external terminal 14 are disposed outside the outer casing 10, and the bypass member 90 is also disposed outside the outer casing 10; therefore, it is possible to readily form the bypass path to short-circuit the positive-electrode external terminal 15 and the negative-electrode external terminal 14 outside the outer casing 10.

As shown in FIG. 4, the insulator 23 is interposed between the outer casing 10, and the positive-electrode external terminal 15 and the negative-electrode external terminal 14, and thus these are electrically insulated from each other. In the configuration as described in JP 2011-258550 A, since the current flows to the opening-sealing part at the time of the short circuit, an electrically-insulating member for electrically insulating the outer casing from the outside is required. To the contrary, in the configuration of the present embodiment, no current is supplied to the outer casing 10, and no member for electrically insulating the outer casing 10 is required; therefore, it is possible to realize the secondary battery 100 having a simpler configuration.

The outer casing 10 has an electric potential different from those of the positive-electrode external terminal 15 and the negative-electrode external terminal 14. Through this configuration, it is possible to suppress occurrence of an unintended short circuit between the positive-electrode external terminal 15 and the negative-electrode external terminal 14.

As shown in FIG. 3, the current cut-off device includes the rivet member 19. The rivet member 19 is fixed to the outer casing 10. The rivet member 19 is electrically connected to the positive-electrode external terminal 15. The rivet member 19 supports the periphery of the inversion plate 41. The rivet member 19 is formed to be hollow. The secondary battery 100 further includes the electrically-conductive member 91. The electrically-conductive member 91 has a function as a perforating portion extending through the rivet member 19 so as to extend from the inside to the outside of the outer casing 10. The electrically-conductive member 91 has a head portion 92 that is an end coupled to the bypass member 90. The inversion plate 41 separated from the current collecting member 51 when the inner pressure of the outer casing 10 is increased comes into contact with the front end 94 that is the opposite end to the head portion 92 of the electrically-conductive member 91 so as to electrically connect the inversion plate 41 and the bypass member 90 to each other via the electrically-conductive member 91. Through this, it is possible to securely form the bypass path to short-circuit the external terminals of the positive and the negative electrodes.

As shown in FIG. 11, the secondary battery 100 includes the electrically-insulating member 191. As shown in FIG. 14, the secondary battery 100 includes the electrically-conductive member 291. The electrically-insulating member 191 and the electrically-conductive member 291 have a function as the perforating member extending through the rivet member 19 so as to extend from the inside to the outside of the outer casing 10. The electrically-insulating member 191 and the electrically-conductive member 291 respectively include the front end 194 and the front end 294 that are the ends coupled to the inversion plate 41. The bypass member 190 fixed to the head portion 192 of the electrically-insulating member 191, or the head portion 292 of the electrically-conductive member 291 comes into contact with the bypass member 90 in accordance with the inversion of the inversion plate 41 separated from the current collecting member 51 when the inner pressure of the outer casing 10 becomes increased. The bypass member 90 and the bypass member 190, or the bypass member 90 and the electrically-conductive member 291 are electrically connected to each other. Accordingly, it is possible to securely form the bypass path to short-circuit the terminals of the positive and the negative electrodes.

As shown in FIG. 1, the battery pack 1 in the embodiments is configured by connecting the plurality of secondary batteries 100 in series each of which corresponds to any one of the aforementioned secondary batteries. When the inner pressure of the outer casing 10 of one of the secondary batteries 100 becomes increased, the bypass path to short-circuit the external terminals of the positive and the negative electrodes is formed; therefore, it is possible to maintain the conduction between two secondary batteries 100 that are adjacent and connected in series to a secondary battery 100 having abnormality. Accordingly, it is possible to pick up electric power from the rest of the normal secondary batteries 100 other than the secondary battery 100 having the abnormality. Accordingly, charging and discharging of the entire battery pack 1 becomes enabled, thereby maintaining the electric power supply from the battery pack 1.

It should be understood that the embodiments disclosed herein have been presented for the purpose of exemplification but not limited in all aspects.

The present disclosure is beneficially applicable to a secondary battery including a current cut-off device.

What is claimed is:

1. A secondary battery comprising:
a battery element;
an outer casing housing the battery element thereinside;
an external terminal of a first electrode and an external terminal of a second electrode that are disposed outside the outer casing; and
a current cut-off device that cuts off a current flow between the battery element and the external terminal of the first electrode when an inner pressure of the outer casing becomes increased,
wherein
the current cut-off device includes:
a current collecting member electrically connected to the battery element inside the outer casing;
an inversion plate electrically connected to the current collecting member; and a bypass member electrically connected to the external terminal of the second electrode, and the inversion plate comes apart from the current collecting member when the inner pressure of the outer casing becomes increased so as to cut off conduction between the battery element and the external terminal of the first electrode, and the inversion plate becomes further deformed to electrically connect the bypass member to the external terminal of the first electrode.

2. The secondary battery according to claim 1, wherein the bypass member is disposed outside the outer casing.

3. The secondary battery according to claim 1, wherein the outer casing is electrically insulated from the external terminal of the first electrode and the external terminal of the second electrode.

4. The secondary battery according to claim 3, wherein the outer casing has an electric potential different from electric potentials of the external terminal of the first electrode and the external terminal of the second electrode.

5. The secondary battery according to claim 1, wherein the current cut-off device includes a rivet member fixed to the outer casing, the rivet member electrically connected to the external terminal of the first electrode, the rivet member supporting a periphery of the inversion plate, the rivet member formed to be hollow, and the secondary battery further includes a perforating member inserted through the rivet member so as to extend from an inside to an outside of the outer casing, the perforating member including an end coupled to the bypass member.

6. The secondary battery according to claim 1, wherein the current cut-off device includes a rivet member fixed to the outer casing, the rivet member electrically connected to the external terminal of the first electrode, the rivet member supporting a periphery of the inversion plate, the rivet member formed to be hollow, and the secondary battery further includes a perforating member inserted through the rivet member so as to extend from an inside to an outside of the outer casing, the perforating member including an end coupled to the inversion plate.

7. A battery pack configured by connecting a plurality of second batteries according to claim 1 in series.

* * * * *